US012346044B2

(12) United States Patent
Suzuki

(10) Patent No.: US 12,346,044 B2
(45) Date of Patent: Jul. 1, 2025

(54) IMAGE FORMING APPARATUS WITH IMPROVED UNIFORMITY OF HEAT AT THE NIP OF ITS FIXING DEVICE

(71) Applicant: CANON KABUSHIKI KAISHA, Tokyo (JP)

(72) Inventor: Ryo Suzuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/500,950

(22) Filed: Nov. 2, 2023

(65) Prior Publication Data

US 2024/0210862 A1 Jun. 27, 2024

(30) Foreign Application Priority Data

Dec. 22, 2022 (JP) ................................. 2022-205017

(51) Int. Cl.
*G03G 15/20* (2006.01)
*G03G 15/00* (2006.01)

(52) U.S. Cl.
CPC ..... *G03G 15/2046* (2013.01); *G03G 15/2042* (2013.01); *G03G 15/657* (2013.01); *G03G 2215/00413* (2013.01); *G03G 2215/00599* (2013.01); *G03G 2215/00945* (2013.01); *G03G 2215/2045* (2013.01)

(58) Field of Classification Search
CPC ............. G03G 15/2046; G03G 15/657; G03G 2215/00413; G03G 2215/0059; G03G 2215/00599; G03G 2215/00734; G03G 2215/00759; G03G 2215/00945; G03G 2215/00949; G03G 2215/2045
USPC ........................................... 399/68, 329, 396
See application file for complete search history.

(56) References Cited

U.S. PATENT DOCUMENTS

| | | | | |
|---|---|---|---|---|
| 2009/0080919 | A1* | 3/2009 | Okada | G03G 15/6564 399/45 |
| 2011/0129267 | A1 | 6/2011 | Arimoto et al. | G03G 15/20 |
| 2013/0259507 | A1* | 10/2013 | Cao | G03G 15/2042 399/69 |
| 2015/0220042 | A1* | 8/2015 | Kanno | G03G 15/6594 399/45 |
| 2018/0074445 | A1* | 3/2018 | Nishida | G03G 15/2046 |
| 2018/0299813 | A1* | 10/2018 | Furuyama | G03G 15/2046 |

(Continued)

FOREIGN PATENT DOCUMENTS

| | | | |
|---|---|---|---|
| JP | H07-191571 | 7/1995 | |
| JP | 2001209291 A * | 8/2001 | |
| JP | 2008134410 A * | 6/2008 | G03G 15/161 |

*Primary Examiner* — Robert B Beatty
(74) *Attorney, Agent, or Firm* — Venable LLP

(57) ABSTRACT

An image forming apparatus includes a fixing portion including a fixing nip for fixing a toner image on a sheet. A controller executes image formation on a first sheet and a second sheet of which size in a widthwise direction is larger than that of the first sheet. The controller changes a time from when a trailing end of the sheet has passed through the fixing nip until when a following sheet reaches the fixing nip. When a width of the toner image to be formed on the sheet in the widthwise direction is defined as an image area width, the controller controls so that the time when the width of the first sheet is equal to or longer than the image area width of the second sheet is shorter than the time when the width of the first sheet is shorter than the image area width.

11 Claims, 14 Drawing Sheets

(56) References Cited

U.S. PATENT DOCUMENTS

| | | | | |
|---|---|---|---|---|
| 2020/0026228 | A1* | 1/2020 | Uchiyama .......... | G03G 15/2039 |
| 2021/0034001 | A1* | 2/2021 | Nihonyanagi ..... | G03G 15/2064 |

* cited by examiner

IMAGE FORMING APPARATUS WITH IMPROVED UNIFORMITY OF HEAT AT THE NIP OF ITS FIXING DEVICE

FIELD OF THE INVENTION AND RELATED ART

The present invention relates to an image forming apparatus such as a printer, copier, FAX, or multifunctional machines.

In an image forming apparatus, after forming a toner image on a recording material, the toner image is fixed to the recording material by a fixing device. For example, the thermal fixing method is used to fix the toner image to the recording material by applying heat and pressure to the recording material, with the recording material being nipped and conveyed into the fixing nip portion formed by a fixing film and pressure rollers in contact with each other. When small-sized paper, which is smaller in width than the maximum width of a recording material that can be printed by the fixing device, is continuously printed in the fixing nip portion in the width direction that intersects the conveyance direction of the recording material, the temperature of the non-sheet passing area of the fixing film where the small-sized paper does not pass can gradually increase (called non-sheet passing portion temperature rise).

However, if the temperature of the non-passing area becomes too high, the toner formed in the corresponding area of the non-passing area on the large-size paper may melt due to excessive heating and adhere to the fixing film and pressure roller when a large-size paper with a larger width than the small-size paper is printed continuously after printing a small-size paper (so-called hot offset). To suppress such the hot offset, an image forming apparatus that performs temperature uniformizing control to uniformize the temperature of the fixing film in the width direction by pre-rotating the fixing film and pressure roller post-rotation after the small-size paper is passed and before the large-size paper is passed, has been proposed (Japanese Laid-Open Patent Application No. H7-191571).

Conventionally, when printing large-size paper following small-size paper, temperature uniformizing control is performed even if no toner image is formed in the corresponding area of the large-size paper. However, if no toner image is formed in the corresponding area of the large-size paper, the hot offset will not occur even if the temperature of the non-sheet passing portion becomes too high. Nevertheless, temperature uniformizing control is conventionally performed, and the start of image forming is delayed until the temperature uniformizing control is completed. Therefore, downtime occurs in the image forming apparatus, and the operational efficiency of the image forming apparatus may decrease.

The present invention is made in view of the above issue, and is intended to provide an image forming apparatus that can both suppress the hot offsets caused by temperature rise in non-sheet passing portion and reduce downtime of the image forming apparatus.

SUMMARY OF THE INVENTION

An embodiment of the present invention is an image forming apparatus comprising: an image forming portion configured to form a toner image on a recording material; a fixing portion including a first rotatable member configured to apply heat to the recording material, a heating portion configured to heat the first rotatable member, and a second rotatable member form a fixing nip portion for fixing the toner image on the recording material by nipping and conveying the recording material in contact with the first rotatable member; and a control portion configured to execute a job in which image formation is performed on a first recording material and a second recording material, continuing to the first recording material, of which size in a widthwise direction crossing to a conveyance direction of the recording material is larger than that of the first recording material, the control portion being capable of changing a time from when a trailing end of a predetermined recording material has passed through the fixing nip portion until when a following recording material continuing to the predetermined recording material reaches the fixing nip portion, wherein when a width of the toner image to be formed on the recording material with respect to the widthwise direction is defined as an image area width, the control portion controls so that the time in a case in which the width of the first recording material is equal to or longer than the image area width of the second recording material is shorter than the time in a case in which the width of the first recording material is shorter than the image area width of the second recording material.

Further features of the present invention will become apparent from the following description of exemplary embodiments with reference to the attached drawings.

DESCRIPTION OF THE EMBODIMENTS

First Embodiment

Image Forming System

Figure 1:
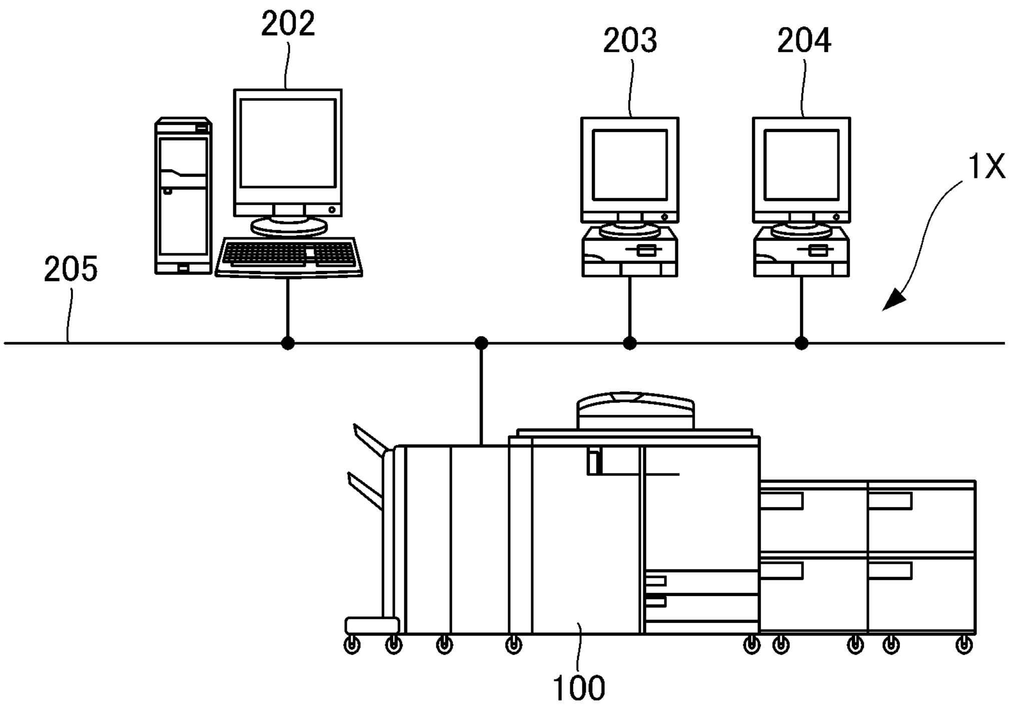
FIG. 1 is a schematic view of an image forming system with an image forming apparatus of the present embodiment.

The following is a detailed description of the embodiments of the present invention with reference to the drawings. FIG. 1 is a schematic view of an image forming system with an image forming apparatus of the present embodiment. The image forming system 1X shown in FIG. 1 has an image forming apparatus 100, a print server 202, and a plurality of client PCs 203 and 204. These image forming apparatus 100, print server 202, and plurality of client PCs 203 and 204 are connected via a communication network 205 to enable transmission and reception of various data. The image forming apparatus 100 has copy and print functions and performs image forming processing on recording material based on image data received from the print server 202 and client PCs 203 and 204 connected via the communication network 205. The recording material can be various types of sheet material, such as plain paper, cardboard, rough paper, uneven paper, coated paper, etc., plastic film, cloth, etc.

Image Forming Apparatus

Figure 2:
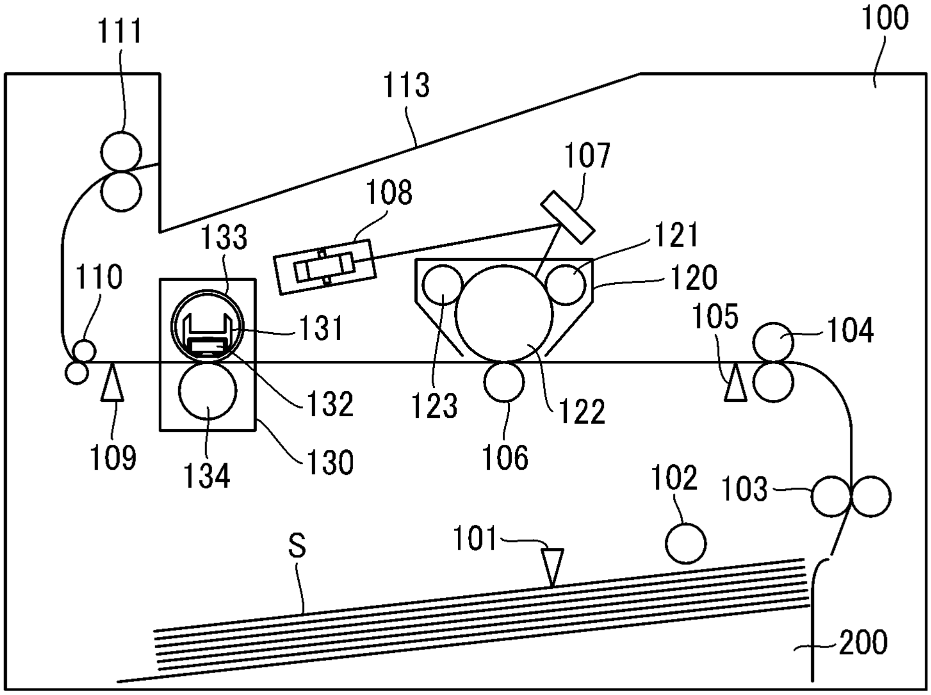
FIG. 2 is a schematic view of the image forming apparatus.

The image forming apparatus 100 is described using FIG. 2. As shown in FIG. 2, the image forming apparatus 100 has a process cartridge 120 that is detachable from the main body of the apparatus. The process cartridge 120 as the image forming portion has a developing roller 121, a photosensitive drum 122, and a charging roller 123.

The photosensitive drum 122 is an electrophotographic photosensitive member with a photosensitive layer formed on the outer circumference of an aluminum cylinder, for example, and is rotated at a predetermined process speed by a motor (not shown). After the surface of the photosensitive drum 122 is uniformly charged to a predetermined potential by the charging roller 123, it is irradiated by a laser light output from a laser optics box 108 and reflected by a laser light reflecting mirror 107. This laser light is converted on and off according to a time-series digital pixel signals based on the image data received from the print server 202, client PCs 203 and 204, or document reader (not shown), and scans and exposes the surface of the photosensitive drum 122. As a result, an electrostatic latent image corresponding to the image data is formed on the surface of the photosensitive drum 122. The electrostatic latent image formed on the surface of the photosensitive drum 122 is then developed by the developing roller 121 into a toner image using developer.

Recording material S is stacked in cassette 200, and when the presence of a recording material is detected in cassette 200 by a recording material presence detection sensor 101, the recording material is fed from the cassette 200 to the conveyance path one sheet at a time by a feeding roller 102. The recording material S is conveyed along the conveyance path by conveying rollers 103 and register roller pair 104. The register roller pair 104 conveys the recording material S to the transfer nip portion formed by the photosensitive drum 122 and a transfer roller 106 at a predetermined timing to synchronize with the toner image formed on the photosensitive drum 122 in response to the leading end of the recording material S in the conveyance direction being detected by a top sensor 105. The transfer roller 106 transfers the toner image from the photosensitive drum 122 to the recording material S by supplying a charge of the opposite polarity to the regular charging polarity of the toner to the recording material S passing through the transfer nip portion. The recording material S that has passed through the transfer nip portion is conveyed to a fixing device 130, where heat and pressure are applied by the fixing device 130 as the fixing portion to fix the toner image on the recording material S. The recording material S with the toner image fixed is detected by a discharge sensor 109 to have passed the leading end in the conveyance direction of the recording material S, and is conveyed by a conveying roller 110 and a discharge roller 111 to be discharged to a discharge tray 113.

The specifications of the image forming apparatus 100 are described below, taking as examples a process speed of "160 mm/sec", a throughput of "15 ppm" for a COM10-size (small-size) envelope, and a throughput of "20 ppm" for A4-size (large-size) plain paper. The throughput here is the number of images formed per unit time, or more precisely, the number of sheets of recording material S that pass through the fixing device 130 per unit time (the number of sheets processed for fixing). With respect to the width direction that intersects the conveyance direction of recording material S, the maximum width of recording material S that can be printed is "210 mm" when A4-size recording material S is conveyed vertically.

Fixing Device

Figure 3:
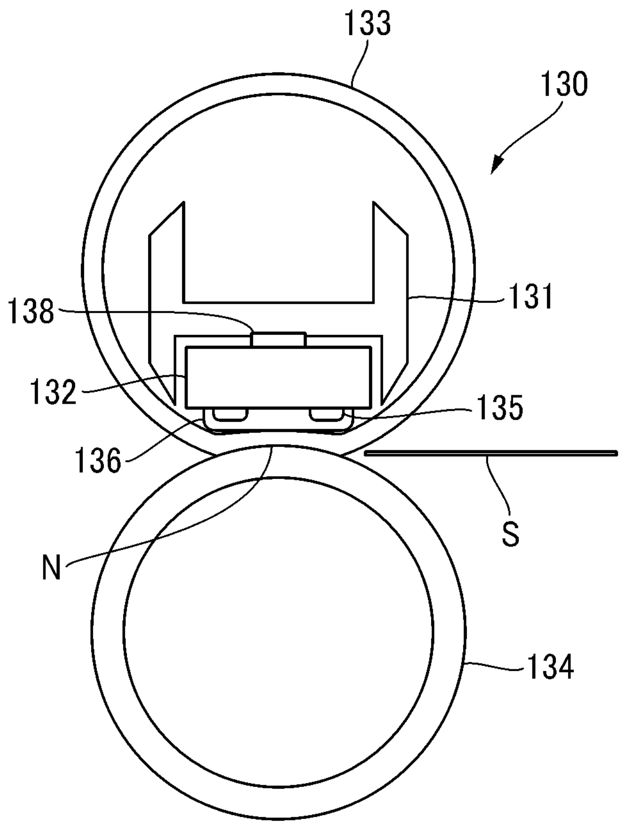
FIG. 3 is a schematic view of the fixing device.

Next, the fixing device 130 is described using FIG. 3. As shown in FIG. 3, the fixing device 130 has a heater 132, a heater holder 131 that holds the heater 132, a heat-resistant, an endless fixing film 133 that is fitted externally to the heater holder 131, and a pressure roller 134. The pressure roller 134 is rotatable and contacts the fixing film 133 to pressurize the film 133. As a result, a fixing nip portion N is formed between the pressure roller 134 and the fixing film 133. The recording material S is subjected to heat and pressure when it is nipped and conveyed into the fixing nip portion N to fix the toner image.

Guiding Member

The heater holder 131 is a member formed by heat-resistant resin and holds the heater 132 and also serves as a guide for rotating the fixing film 133 in a circular motion. The heater holder 131 is formed from a highly heat-resistant resin with excellent workability, such as polyimide, polyamide-imide, polyetheretherketone, polyphenylene sulfide, liquid crystal polymer, or a composite material consisting of these resins and ceramics, metal, glass, etc. Liquid crystalline polymer was used in the present embodiment.

Heater

The heater 132 as the fixing portion is held by the heater holder 131 and is positioned inside the fixing film 133. The heater 132 heats the fixing film 133 by sliding against the inner surface of the rotating fixing film 133. The heater 132 is a ceramic heater, for example, and a ceramic substrate is used as the heater plate, which is made of a ceramic such as alumina or aluminum nitride that has good thermal conductivity and high insulation properties. The heater plate is formed in a rectangular shape with a thickness of 0.5 to 1.0 mm, a length of 10 mm in the short-hand direction (conveyance direction of recording material S), and a length of 300 mm in the longitudinal direction (width direction) in order to reduce the heat capacity.

On one side of the heater 132, a heat-generating resistor 135 is extended along the longitudinal direction. The heat-generating resistor 135 is mainly made of silver-palladium alloy, nickel-tin alloy, ruthenium oxide alloy, etc., and is formed by screen printing, etc. to a thickness of "10 μm", a length of "1 to 5 mm" in the short-hand direction, and a length of "222 mm" in the longitudinal direction. The length of "222 mm" in the longitudinal direction is set longer than the length of the recording material S of the maximum width (e.g., 210 mm) in order to enable the toner image to be fixed to both ends of the recording material S of the maximum width in terms of the width direction. The heat-generating resistor 135 is arranged so that its center in the width direction is roughly aligned with the center of the recording material S.

The heater plate and the heat-generating resistor 135 are overcoated with insulating glass 136 as an electrical insulating layer. An insulating glass 136 is provided to ensure insulation between the heat-generating resistor 135 and the fixing film 133, as well as to prevent damage to the heater plate and the heat-generating resistor 135. The appropriate thickness of the insulating glass 136 is, for example, "20 to 100 μm". The insulating glass 136 also functions as a sliding layer on which the fixing film 133 slides.

Fixing Film

The fixing film 133 is externally fitted to the heater holder 131, which holds the heater 132. The inner circumference length of the fixing film 133 is longer than the outer circumference length of the heater holder 131, and the fixing film 133 is externally fitted to the heater holder 131 with a margin in circumference length.

The fixing film 133 as the first rotating element can be a monolayer film or a composite layer film of heat-resistant polytetrafluoroethylene (PTFE), tetrafluoroethylene/perfluoroalkyl vinyl ether copolymer (PFA), tetrafluoroethylene/hexafluoropropylene copolymer (FEP), etc. with a film thickness of "20 to 70 μm" to efficiently apply heat from heater 132 to recording material S in the fixing nip portion N.

The composite layer film has a base layer of polyimide, polyamide-imide, polyetheretherketone (PEEK), polyethersulfone (PES), polyphenylene sulfide (PPS) or stainless steel foil (SUS foil) and an elastic layer formed on the surface of the base layer to improve fixing performance. The elastic layer is made of an elastic material such as silicone rubber, for example, mixed with a heat-conductive filler such as ZnO, Al2O3, SiC, or silicon metal. In addition, PTFE, PFA, FEP, PES, etc. may be coated on the surface of the elastic layer.

In the present embodiment, a conductive polyimide with a thickness of "50 μm" mixed with filler is used as the base layer, a "silicone rubber-thermal conductive filler mixed layer" with a thickness of "240 μm" is used as the elastic layer, and PTFE is coated on the surface of the elastic layer. Although a thin fixing film 133 is shown here as an example, it is not limited to this, but a fixing belt formed in an endless shape by a resin such as rubber, for example, may also be used.

Pressure Roller

The pressure roller 134 as the second rotating element is provided to form a fixing nip portion N between the fixing film 133 and the heater 132, and to rotate and drive the fixing film 133. The pressure roller 134 is an elastic roller with a metal core made of SUS, SUM, Al, or other metal and an elastic layer formed by foaming heat-resistant rubber such as silicone rubber and fluorine rubber or silicone rubber on its outer circumference. The pressure roller 134 may have a detachable layer of PFA, PTFE, FEP, or the like formed on top of this elastic layer. In the present embodiment, the pressure roller 134 is an aluminum metal core with an elastic layer formed by silicone rubber of thickness "4.0 mm" and a detachable layer formed by PFA of thickness "50 μm".

Thermistor

Figure 4:
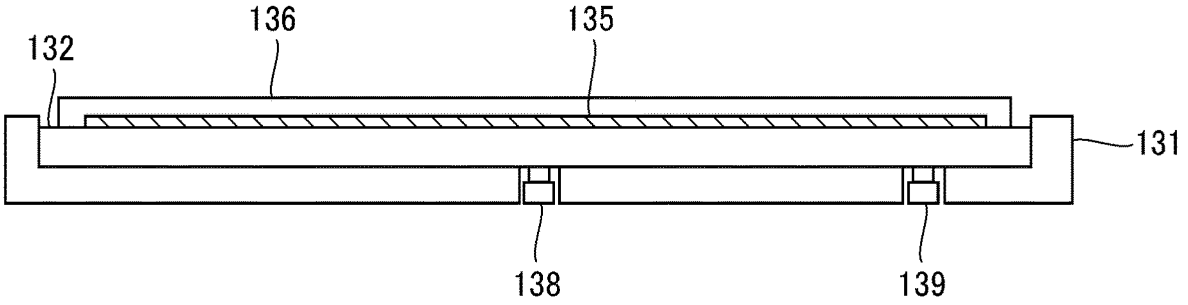
FIG. 4 is a cross-sectional view showing the thermistor located in the heater.

The heater 132 is equipped with a thermistor to detect its temperature. FIG. 4 shows the thermistors arranged in heater 132. As shown in FIG. 4, in the present embodiment, with respect to the longitudinal direction of the heater 132, the center thermistor 138 is located in the center and the end thermistors 139 are located closer to the ends than in the center. The center thermistor 138 detects the temperature at the center of the heater 132, and the end thermistor 139 detects the temperature at the ends of the heater 132.

The thermistors (138, 139) are, for example, NTC (Negative Temperature Coefficient) thermistors whose resistance decreases as the temperature rises. The temperatures of the center portion and the end portion of the heater 132 detected by the thermistors (138, 139) are output to the engine controller (not shown), which can control the power supplied to the heater 132 to maintain the fixing temperature of the heater 132 at a predetermined fixing temperature (target temperature) based on those temperatures.

The image forming apparatus 100 is capable of printing on recording material S of various widths. The recording material S of the maximum printable width is called large-size paper, and the recording material S of smaller width is called small-size paper. When multiple sheets of small-size paper are continuously printed, the temperature of the non-passing area where recording material S does not pass through at both ends of the fixing film 133 and pressure roller 134 in the longitudinal direction may rise gradually, causing the temperature of the non-sheet passing portion to rise.

The center thermistor 138 as the first detection portion is located at a position where the temperature of the passing area through which the recording material S passes in the fixing nip portion N can be detected regardless of the width of the recording material S, for example, at the center of the heat-generating resistor 135. On the other hand, the end thermistor 139 as the second detection portion is installed at a position where the temperature of the above-mentioned non-passing area (more precisely, the detection area to be described later) can be detected. In the case of the present embodiment, the end thermistor 139 is located "105 mm" away from the center of the heat-generating resistor 135, closer to the edge.

In the present embodiment, the case in which only one thermistor (end thermistor 139) for detecting the temperature of the non-passing area is arranged as an example, but it is not limited to this case, and multiple thermistors for detecting the temperature of the non-passing area may be arranged. This is because the temperature of the non-passing area varies depending on the width of the different types of small-size paper, and the temperature of the non-passing area can be detected correctly by switching the thermistors according to the type of small-size paper with different widths by placing multiple thermistors at different positions in the longitudinal direction in relation to the heater 132.

Figure 5:
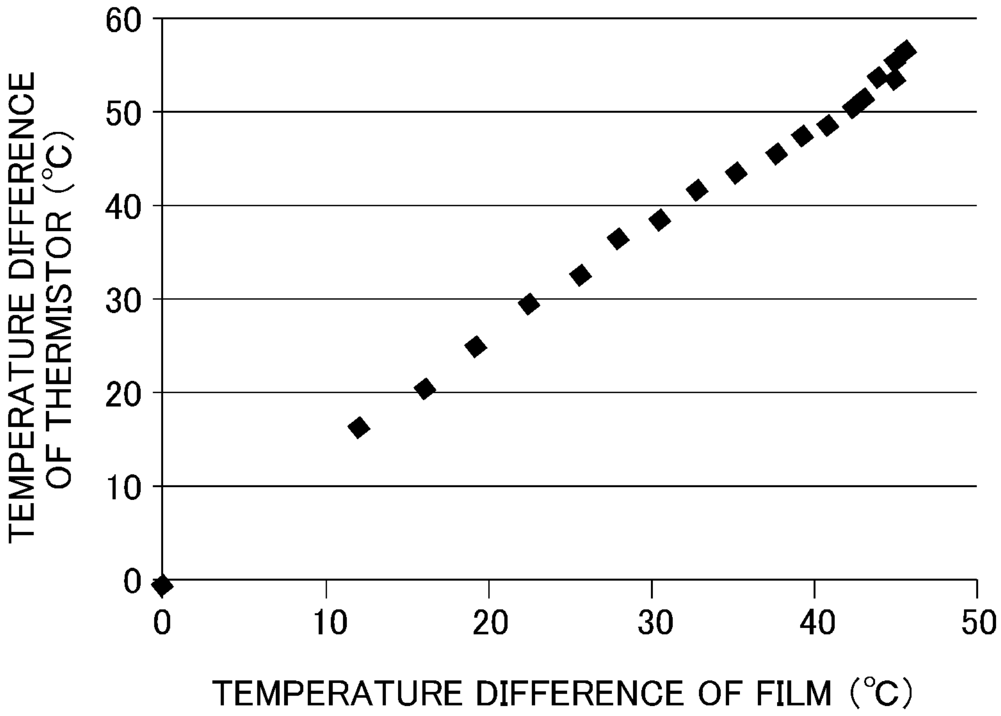
FIG. 5 is a graph showing the relationship between the temperature difference between the central thermistor and the end thermistor and the temperature difference between the passing and non-passing areas in the fixing portion of the film.

FIG. 5 shows the relationship between the "temperature difference between the passing and non-passing areas in the fixing film 133" and the "temperature difference between the temperature detected by the center thermistor 138 and the temperature detected by the end thermistor 139 (temperature difference between the areas)". The example shown here is a case where 20 COM10 size envelopes (small-size paper) are continuously passed at a throughput of 15 ppm. As shown in FIG. 5, the temperature difference of the thermistors (138, 139) and the temperature difference of the fixing film 133 are correlated, and therefore, the temperature difference of the fixing film 133 can be accurately predicted from the temperature difference of the thermistors (138, 139). In other words, based on the detection results of the thermistors (138, 139), it is possible to detect whether or not a non-passing portion temperature increase is occurring in the fixing film 133. The occurrence of non-passing portion temperature increase may be detected based on the width of the small-size paper to be passed, the number of sheets passed, and the time elapsed since the end of passage of the small-size paper, not limited to detecting the occurrence of non-passing portion temperature increase based on the temperature difference of the thermistors (138, 139).

Figure 6:
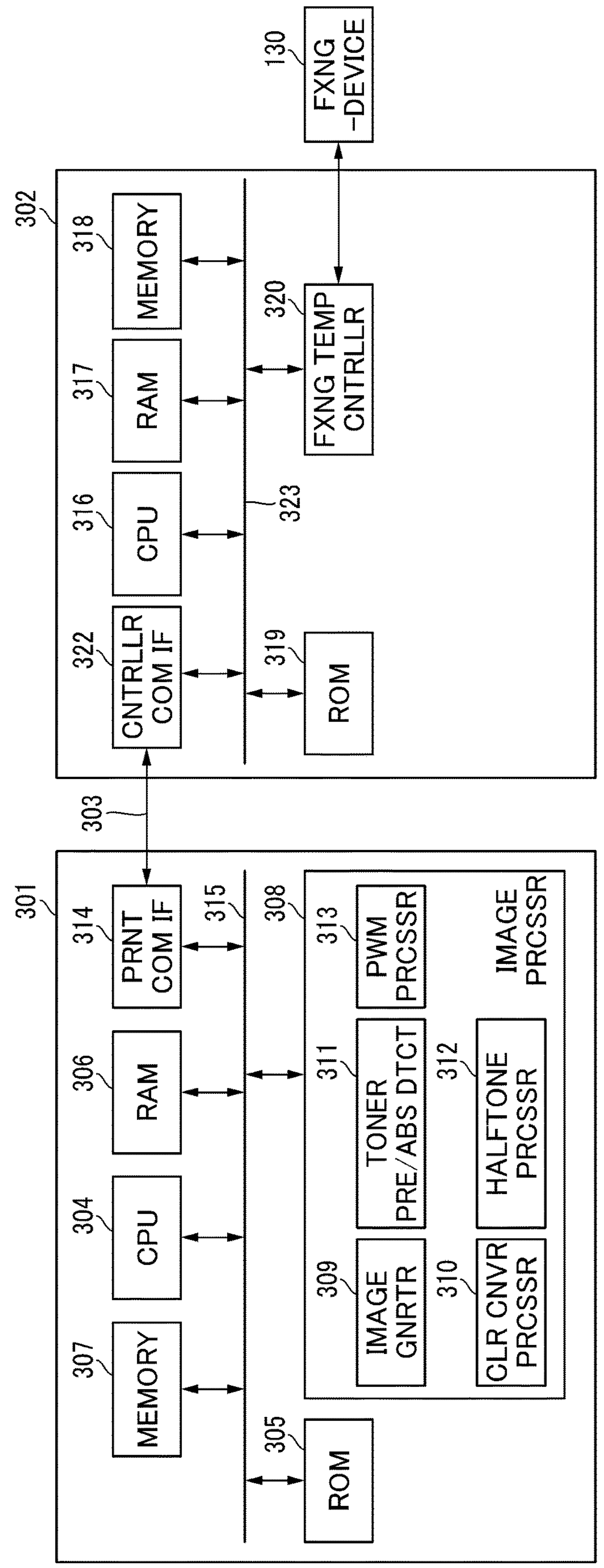
FIG. 6 is a control block view showing the control system of the image forming apparatus.

Next, the control system that controls the image forming apparatus 100 is described using FIG. 6. As shown in FIG. 6, the image forming apparatus 100 has a system controller portion 301 and a print controller portion 302 as control portions. The example shown here is divided into a system controller portion 301 and a print controller portion 302, but it is not limited to this. For example, the system controller portion 301 and the print controller portion 302 may be a single controller portion having a CPU, ROM, RAM, etc.

The system controller portion 301 has a central processing unit (CPU) 304, read only memory (ROM) 305, random access memory (RAM) 306, memory portion 307, image processing portion 308, printer communication interface (IF) 314. These are connected to each other by a bus 315 to enable data transmission and reception. CPU 304 can read and execute programs (e.g., the classification process described below) stored in ROM 305. RAM 306 is used as a memory for temporarily storing programs and various data, i.e., main memory for work.

The memory portion 307 is, for example, a hard disk drive (HDD) and stores image data and other data. The image processing portion 308 includes an image generation portion 309, a color conversion processing portion 310, a toner presence/absence detection portion 311, a halftone processing portion 312, and a PWM processing portion 313, and performs image processing such as copying and printing. The image generation portion 309 generates image forming portion of raster image data from image data received from the print server 202, client PCs 203 and 204 (see FIG. 1), etc. and stored in the memory portion 307, and outputs RGB data and attribute data indicating the data attributes of each pixel for each pixel.

The color conversion processing portion 310 performs CMYK conversion of RGB data output from the image generation portion 309 to match the toner color, and performs color conversion processing to generate CMYK data and attribute data. CMYK data indicates information on the amount of toner (hereinafter referred to as "image density") for cyan, magenta, yellow, and black (CMYK) colors, and is expressed in 8-bit values from 0 to 255 for each color in each pixel. Specifically, a pixel density value of "0" for each color in CMYK data indicates that no toner is used, and as the pixel density value for each color increases, the density becomes denser, with a pixel density value of "255" indicating the maximum density for each color. A pixel density value of "255" means a toner loading of "100%", and the toner loading of each CMYK color is added together to obtain the toner loading per pixel in the toner image to be formed. For example, if the pixel densities of two of the CMYK colors are 255, the sum of the pixel densities of these two colors is 510, which is the toner loading of 200% for the pixel in question. The color conversion processing portion 310 sends the generated CMYK data and attribute data to the toner presence/absence detection portion 311 and the halftone processing portion 312.

The toner presence/absence detection portion 311 detects the presence or absence of toner in the detection area described below based on the CMYK data generated by the color conversion processing portion 310. In the present embodiment, the toner presence/absence detection portion 311 obtains the printing area ratio (0-100%) of the detection area based on the CMYK data of the detection area, and detects the presence of toner in the detection area when the printing area ratio of the toner image formed in the detection area exceeds the threshold value (1% in this case), for example. The detection area for detecting the presence of toner is described below.

Halftone processing portion 312 performs halftone processing on the CMYK data for each color output from color conversion processing portion 310. Halftone processing can be done, for example, by screen processing or by error diffusion processing. Screen processing uses a predetermined number of dither matrices to N-value the input CMYK data. Error diffusion processing is a process to N-value a given pixel of the input CMYK data by comparing it with a threshold value, and diffuse the difference between the given pixel and the threshold value generated in the N-value process to the surrounding pixels to be N-valued in subsequent processes.

The PWM processing portion 313 converts halftone CMYK data (called halftone data) output from the halftone processing portion 312 into PWM (Pulse Width Modulation). PWM processing portion 313 has a conversion table (not shown) for PWM conversion of, for example, 4-bit halftone data image signals, and the halftone data image signals are converted to digital pixel signals for turning the laser light on and off according to the conversion table.

The print controller portion 302 has a CPU 316, ROM 319, RAM 317, memory portion 318, fixing temperature control portion 320, and controller communication interface (IF) 322. These are connected to each other by a bus 323 to enable data transmission and reception. CPU 316 is capable of executing programs stored in ROM 319 (e.g., the uniformization process described below). RAM 317 is used as a memory for temporarily storing programs to be executed and various data, i.e., main memory for work. The memory portion 318 is, for example, an HDD, etc., and stores image data and other data.

The printer communication interface 314 and the controller communication interface 322 are used to send and receive data between the system controller portion 301 and the print controller portion 302. Data transmitted and received between the system controller portion 301 and the print controller portion 302 include image data, various control signals, and the presence or absence of toner in the detection area detected by the toner presence/absence detection portion 311.

The fixing temperature control portion 320 controls the temperature of the fixing device 130 according to the "uniformization process" executed after passing small-size paper and before passing large-size paper. In this process, the fixing temperature control of the fixing device 130, and more specifically, the temperature control of the heater 132, is performed based on the presence or absence of toner in the detection area transmitted from the system controller portion 301 to the print controller portion 302.

Uniformization Process

In the present embodiment, during a continuous image forming job in which images are formed on multiple sheets of small-size paper followed by image forming on large-size paper, the temperature of the fixing film 133 is uniformized after the small-size paper is finished passing before starting to pass the large-size paper. In this way, the temperature of the non-passing area is lowered in the fixing film 133 before passing the large-size paper to suppress the hot offsets caused by the rising temperature of the non-sheet passing portion.

Figure 7:
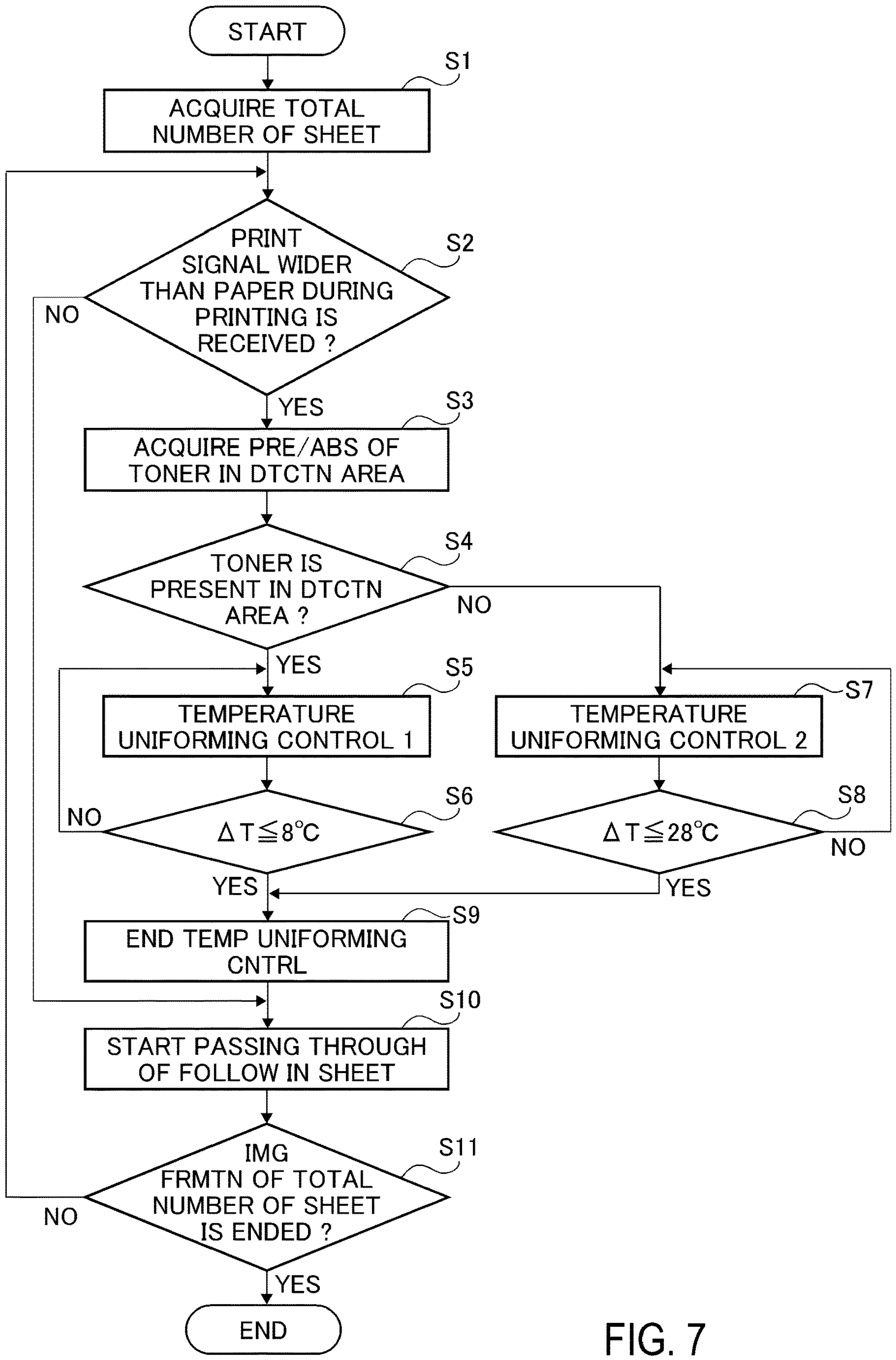
FIG. 7 is a flowchart showing the uniformization process in the first embodiment.

The "uniformization process" of the first embodiment is described using FIG. 7 with reference to FIG. 6.

The "uniformization process" of the present embodiment is started by CPU 316 with the start of a "continuous image forming job" and is terminated with the end of a "continuous image forming job".

As shown in FIG. 7, the CPU 316 obtains from the system controller portion 301 the total number of sheets of small-size paper and large-size paper to be image formed by the continuous image forming portion (S1). Then, depending on whether or not the CPU 316 receives a print signal for large-size paper, which is wider than the small-size paper being printed, in the continuous image forming job being executed, the CPU 316 determines whether or not image forming of small-size paper is completed and image forming of large-size paper is continued (S2).

When a print signal for a large-size paper wider than the small-size paper being printed has not been received, i.e., continuous image forming of small-size paper is to be continued (NO in S2), the CPU 316 jumps to processing step S10. On the other hand, if a print signal for a large-size paper wider than the small-size paper being printed is received (YES in S2), the CPU 316 pauses the continuous image forming of the image forming job being executed and obtains from the system controller portion 301 the "toner availability in the detection area" as detected by the toner presence/absence detection portion 311 (S3). The toner presence/absence detection by the toner presence/absence detection portion 311 is performed at the timing when the width of the recording material S to be image formed switches from small paper (small-size paper) to large paper (large-size paper).

Detection Area

Figure 8:
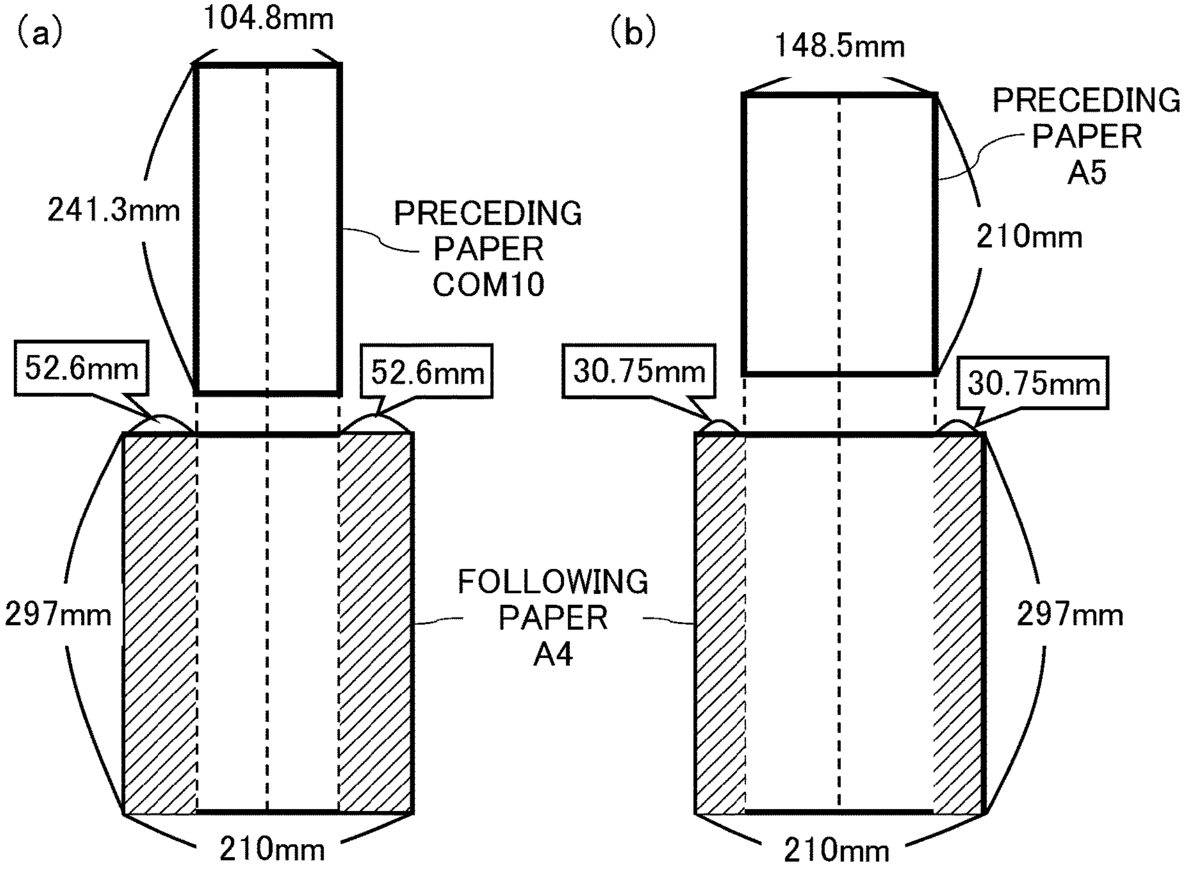
FIG. 8 is a conceptual view showing the detection area, with part (a) showing the case where an A4-size paper is passed vertically after a COM10-size envelope is finished passing vertically, and part (b) showing the case where an A4-size paper is passed vertically after an A5-size paper is finished passing horizontally.

In the present system, the "detection area" is the "area on the large-size paper corresponding to the non-passing area of the small-size paper", that is, the area formed by the "difference between the lengths of the small-size paper and large-size paper" in the width direction and the "length of the large-size paper" in the conveyance direction. Part (a) of FIG. 8 shows the detection area for detecting the presence/absence of toner in the large-size paper with a shaded line, using the case where an A4-size paper is passed lengthwise as the large-size paper after a COM10-size envelope is passed lengthwise as the small-size paper. In this case, the shaded area A4 size paper is 52.6 mm wide from the left and right edges in the width direction and 297 mm long in the conveyance direction, and this corresponding area is the detection area for detecting the presence/absence of toner.

The detection area varies depending on the combination of small-size paper and large-size paper that are image forming in a continuous image forming job. For example, as shown in part (b) of FIG. 8, when A4 size paper is passed vertically as large size paper after A5 size paper is passed horizontally as small size paper, the detection area A4 size paper has a shaded area of 30.75 mm in width and 297 mm in length in the conveyance direction from the left and right edges in the width direction.

Returning to the description in FIG. 7, CPU 316 determines the presence or absence of toner in the detection area based on the received "presence/absence of toner in the detection area" (S4). If there is toner in the detection area (YES in S4), the CPU 316 executes "temperature uniformization control 1" (S5). CPU 316 repeats the "temperature uniformization control 1" until the "temperature difference between the passing and non-passing areas in the fixing film 133", i.e., the "temperature difference ΔT between the detection temperature of the center thermistor 138 and the detection temperature of the end thermistor 139", is less than the threshold temperature difference (8° C. here) (S6). In this case, CPU 316 changes the threshold temperature difference to "8° C." (first temperature difference) if there is toner in the detection area. If the temperature difference ΔT becomes less than or equal to the threshold temperature difference by "temperature uniformization control 1" (YES in S6), CPU 316 terminates "temperature uniformization control 1" (S9).

On the other hand, if there is no toner in the detection area (NO in S4), CPU 316 executes "temperature uniformization control 2" (S7). CPU 316 repeats "temperature uniformization control 2" until "the temperature difference ΔT between the detection temperature of the center thermistor 138 and the detection temperature of the end thermistor 139" becomes less than the threshold temperature difference (28° C. in this case) (S8). In the present embodiment, if there is no toner in the detection area, the CPU 316 changes the threshold temperature difference to "28° C." (the second temperature difference), which is a higher temperature difference than if there is toner. In this way, the temperature difference between the temperature of the area where the large-size paper passes through the fixing nip portion N and the temperature of the detection area when the large-size paper arrives at the fixing nip portion N after the small-size paper passes through N is larger when no toner image is formed in the detection area than when a toner image is formed in the detection area. If the temperature difference ΔT becomes less than or equal to the threshold temperature difference by the "temperature uniformization control 2" (YES in S8), the CPU 316 terminates the "temperature uniformization control 2" (S9). In the above "temperature uniformization control 1" and "temperature uniformization control 2", the heater 132 is controlled to heat the fixing film 133 at a temperature capable of lowering the temperature of the non-passing area, and the fixing film 133 and pressure roller 134 are controlled to rotate idly (idle rotation mode).

After the "temperature uniformization control 1" or "temperature uniformization control 2" is completed (S9), the CPU 316 restarts the continuous image forming job that was stopped to perform these temperature uniformization controls, and starts feeding the large-size paper, which is the subsequent paper following the small-size paper (S10). The CPU 316 then determines whether or not image formation for the total number of sheets of small-size paper and large-size paper has been completed (S11). If image formation for the total number of sheets has been completed (YES in S11), the CPU 316 terminates the uniformization process. If image formation for the total number of sheets has not been completed (NO in S11), the CPU 316 returns to the process in step S2 and repeats the above steps S2 to S10.

Temperature Uniformization Control

Figure 9:
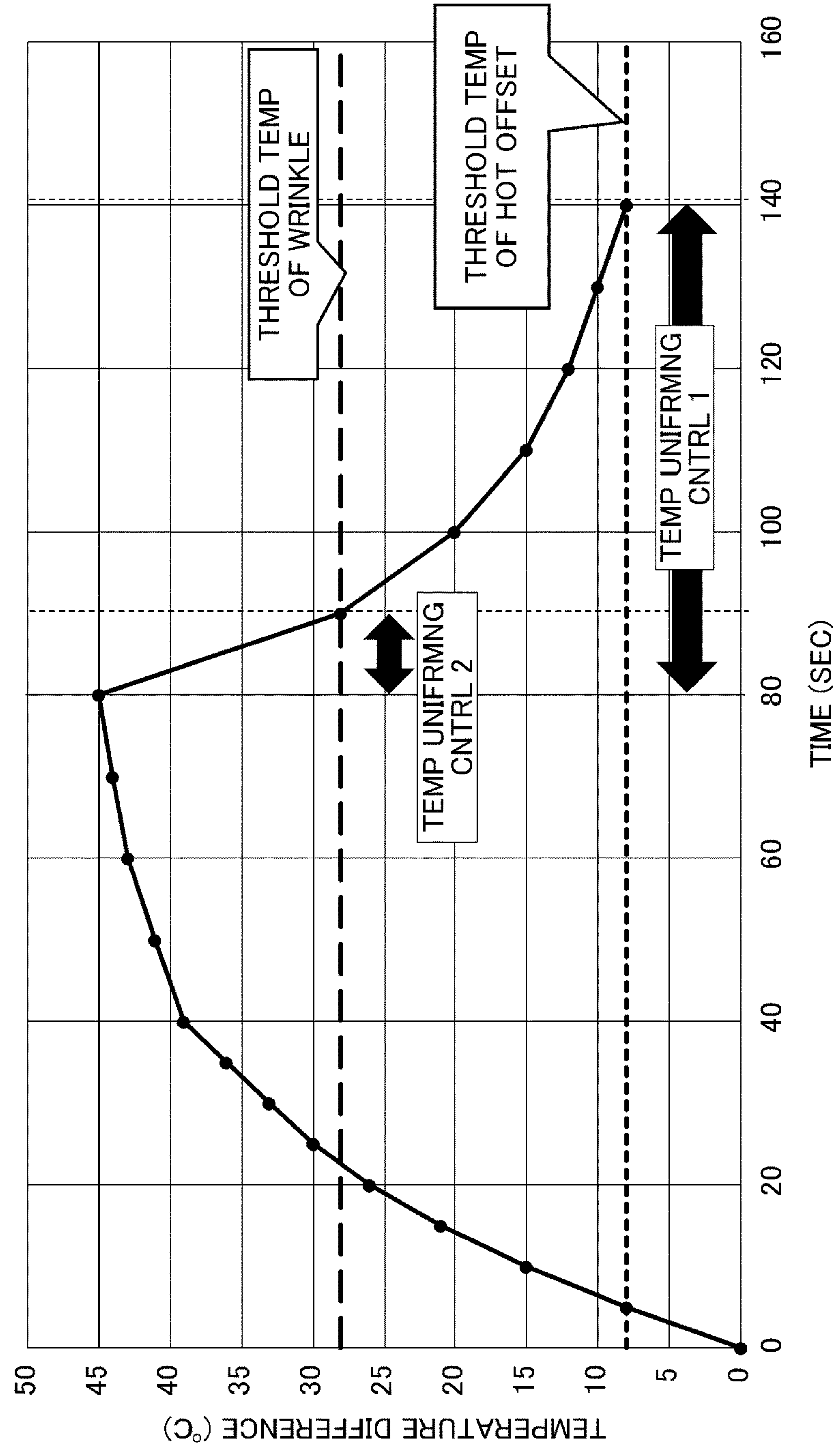
FIG. 9 is a graph showing the time variation of the temperature difference between the passing and non-passing areas in the first embodiment.
Figure 10:
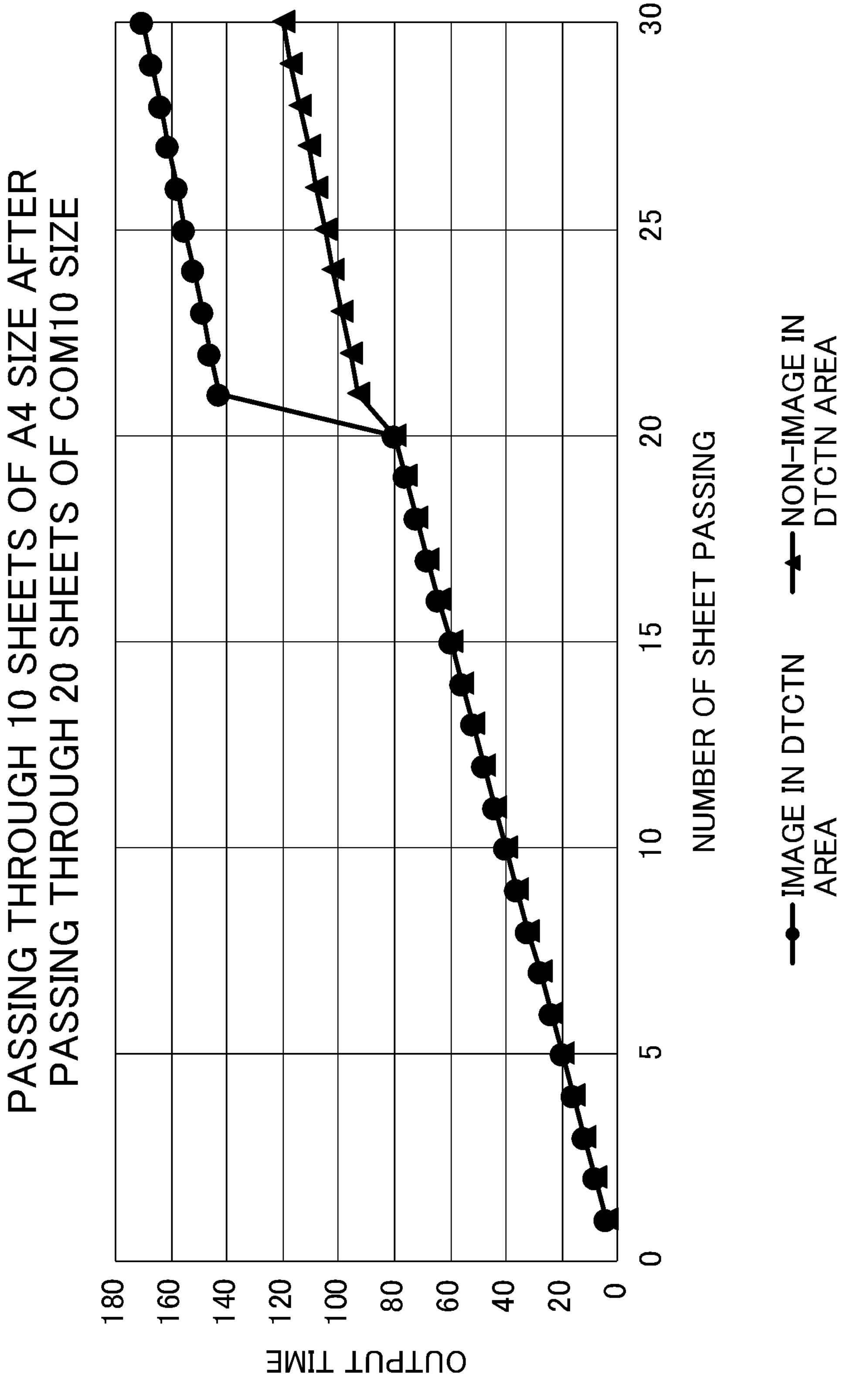
FIG. 10 is a graph showing the difference in output time depending on the presence or absence of a toner image in the detection area.

The above temperature uniformization control is explained using FIGS. 9 and 10. FIG. 9 shows the time variation of the temperature difference between the passing and non-passing areas in the fixing film 133 when 20 COM10 size envelopes (small-size paper) of "104.7 mm" paper width are continuously passed. For example, when small-size paper is passed at a throughput of "15 ppm" (4 seconds/sheet), as shown in FIG. 9, the temperature difference between the passing and non-passing areas in the fixing film 133 is "45° C." at the end of the small-size paper passing. If A4 size paper (large-size paper) with a paper width of "210 mm" is passed without the above-mentioned "temperature uniformization control" after the end of feeding the small-size paper, the hot offset can occur if a toner image is formed in the corresponding area A (detection area) of the large-size paper and toner is present.

As described above, in the present embodiment, "temperature uniformization control 1 (S5)" and "temperature uniformization control 2 (S7)" are performed to equalize the temperature of the fixing film 133 after the end of small-size paper passing and before the large-size paper passing. Immediately after the end of small-size paper passing, it is effective to standby time for large-size paper passing until the temperature of the non-passing area drops to some extent, but if the fixing film 133 is stoodby in a stopped state, it takes quite a long time for the temperature of the non-passing area to drop. In other words, it takes time for the temperature of the fixing film 133 to reach temperature uniformization immediately after the end of small-size paper passing. In contrast, when the fixing film 133 and pressure roller 134 are idly rotated while the heater 132 is set at a lower temperature than the fixing temperature, the temperature of the non-passing area can be lowered more quickly than when the fixing film 133 is left in a stopped state. Therefore, such control is performed in the "temperature uniformization control" of the present embodiment.

By the way, the hot offset caused by the temperature increase in the non-sheet passing portion will be less likely to occur if the temperature of the non-passing area is lowered before passing of large-size paper. In the case of the present embodiment, the hot offset can be suppressed by lowering the temperature of the fixing film 133, which has a lower temperature by removing heat in passing of the small-size paper, and the temperature of the non-passing area, which has a higher temperature due to the temperature increase in the non-sheet passing portion, until the temperature difference with the passing area is "8° C. or less", Therefore, in the present embodiment, "temperature uniformization control 1" is performed until the temperature difference between the passing area and the non-passing area becomes "8° C. or less" as described above (see S5 in FIG. 7).

As shown in FIG. 9, for example, it takes "60 seconds" (80 to 140 seconds) from the end of the passage of small-size paper (80 seconds) until the temperature difference between the passing area and the non-passing area becomes "8° C." by performing "temperature uniformization control 1" after 20 small-size paper envelopes are continuously passed at a throughput of "15 ppm". The 60 seconds (first time), which is the processing time for "temperature uniformization control 1", is also the time during which the continuous image forming job is temporarily stopped, which is the downtime of the image forming apparatus 100.

Even if the temperature of the non-sheet passing portion increases, the hot offset will not occur if there is no toner image formed in the corresponding area of the large-size paper, i.e., if there is no toner. Therefore, if no toner image is formed in the corresponding area of the large-size paper, "temperature uniformization control" does not need to be performed. However, conventionally, even if no toner image is formed in the corresponding area of the large-size paper, the same temperature uniformization control is performed as when a toner image is formed. Therefore, conventionally, a downtime of "60 seconds" occurred even when no toner image was formed in the corresponding area of the large-size paper and no toner was present.

In contrast, in the present embodiment, "temperature uniformization control 2" is performed even when no toner image is formed in the corresponding area of the large-size paper (see S7 in FIG. 7). This is to make it difficult for "wrinkles" to occur on the large-size paper. For example, if the temperature difference between the area where the fixing film 133 passes through and the area where it does not pass through exceeds "28° C.", the pressure roller 134 is easily affected by the heat and expands, and a difference may occur in the outer diameter of the pressure roller 134 between the center side and the edge side in the width direction. If the pressure roller 134 has a difference in outer diameter, "wrinkles" are likely to occur when the large-size paper passes through the fixing nip portion N. Therefore, in the present embodiment, as described above, when no toner image is formed in the corresponding area of the large-size paper, "temperature uniformization control 2" is performed until the temperature difference between the passing and non-passing areas is "28° C. or less" (see S7 in FIG. 7). In this way, "wrinkles" are less likely to occur on the large-size paper.

As shown in FIG. 9, for example, it takes "10 seconds" (80 to 90 seconds) from the end of the passage of small-size paper (80 seconds) to reach a temperature difference of "28° C." between the passing and non-passing areas by performing "temperature uniformization control 2" after 20 consecutive sheets of small-size paper (envelopes) are passed at a throughput of "15 ppm". The processing time of "temperature uniformization control 2" of "10 seconds" (second time) is also the time when continuous image forming jobs are temporarily stopped, which is the downtime of the image forming apparatus 100, but it is a shorter time than in the past.

FIG. 10 shows the output time according to the case where 20 sheets of COM10 size envelopes (small-size paper) are continuously passed, and 10 sheets of A4 size paper (large-size paper) are continuously passed after the above "temperature uniformization control" is performed. The time required to continuously pass 20 sheets of small-size paper is "80 seconds" and the time required to continuously pass 10 sheets of large-size paper is "30 seconds".

In the present embodiment, "temperature uniformization control 1" is performed when there is toner in the corresponding range of the large-size paper. Hence, as shown in FIG. 10, the passing of the large-size paper starts at "140 seconds" after the "temperature uniformization control 1" processing time of "60 seconds" has elapsed from the end of the passage of the small-size paper (80 seconds). Then, it takes “30 seconds” to pass 10 sheets of large-size paper, so it takes “170 seconds” to finish this continuous image forming job.

On the other hand, if there is no toner in the corresponding area of the large-size paper, “temperature uniformization control 2” is performed. Therefore, as shown in FIG. 10, the paper passing of the large-size paper starts at “90 seconds” after the processing time of “temperature uniformization control 2” has elapsed “10 seconds” from the end of the passage of the small-size paper (80 seconds). In other words, the time from when the small-size paper passes through the fixing nip portion N to when the large-size paper reaches the fixing nip portion N is made shorter when no toner image is formed in the detection area than when a toner image is formed in the corresponding area of the large-size paper. In other words, the time between the small-size paper passing through the fixing nip portion N and the large-size paper reaching the fixing nip portion N is shorter when no toner image is formed in the detection area than when a toner image is formed in the corresponding area of the large-size paper. Then, it takes “30 seconds” to pass 10 sheets of large-size paper, so it takes “120 seconds” to finish this continuous image forming job. In other words, the time required for a continuous image forming job can be reduced by “50 seconds”. Thus, when there is no toner in the corresponding range of large-size paper, the processing time for “temperature uniformization control” can be shorter than when there is toner. In other words, the operational efficiency of the image forming apparatus 100 can be improved because the downtime of the image forming apparatus 100 can be reduced.

As described above, in the present embodiment, when “temperature uniformization control” is performed to lower the temperature of the non-passing area in the fixing film 133 after the end of the small-size paper pass-through, the processing time of “temperature uniformization control” changes depending on whether there is toner in the corresponding area of the large-size paper or no toner. The “temperature uniformization control” is performed until the “temperature difference between the passing and non-passing areas on the fixing film 133” is compared with the threshold temperature difference and the temperature difference becomes less than or equal to the threshold temperature difference. If there is no toner in the corresponding area, the threshold temperature difference is changed to a higher temperature than when there is toner. That is, if there is no toner, the temperature difference may be higher than when there is toner, so the time to lower the temperature of the non-passing area may be shortened, and the processing time of the “temperature uniformization control” becomes shorter. Thus, both suppression of the hot offsets caused by temperature rise in the non-sheet passing portion and reduction of image forming apparatus downtime can be achieved.

Second Embodiment

Figure 11:
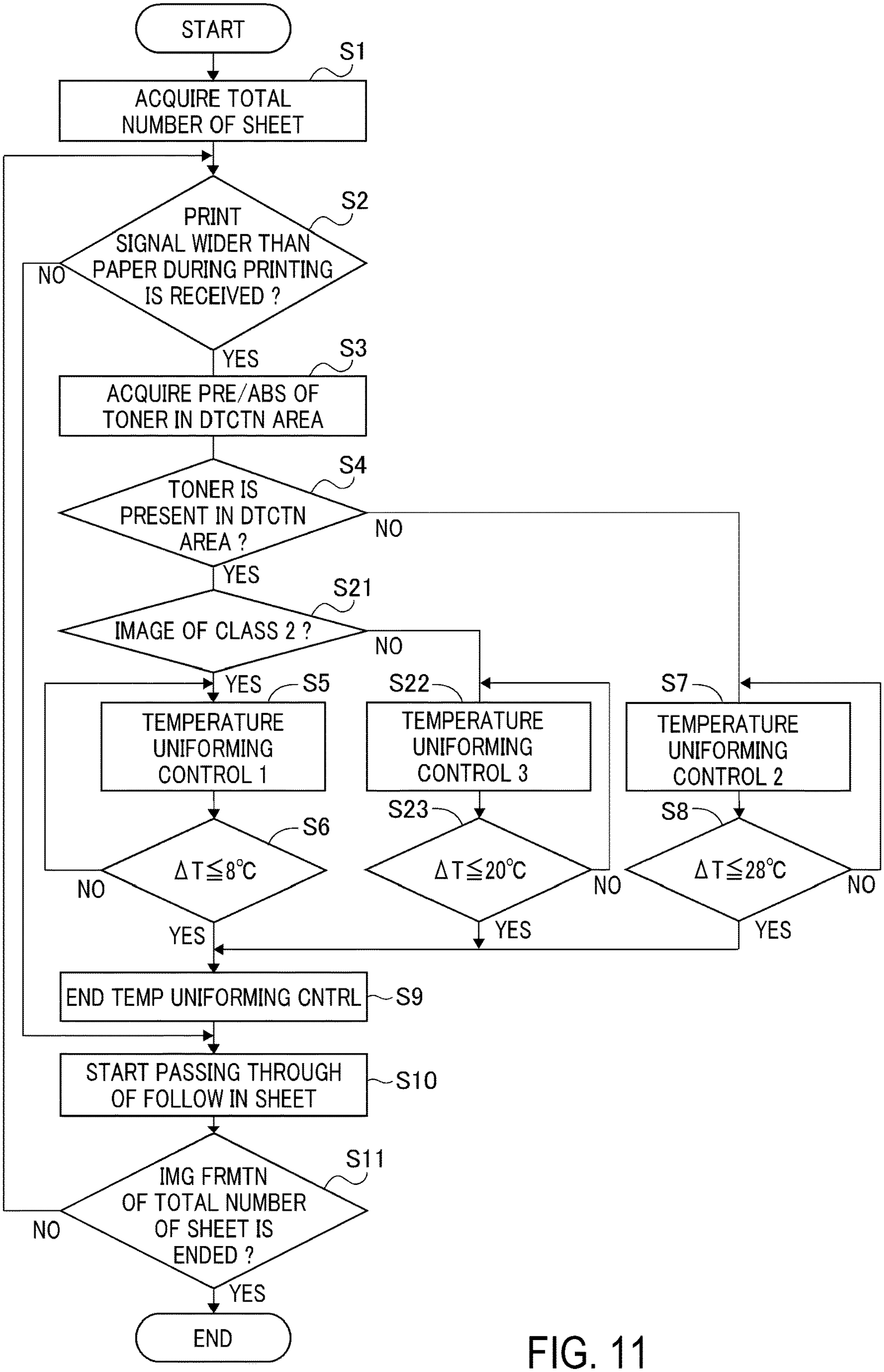
FIG. 11 is a flowchart showing the uniformization process in the second embodiment.

By the way, the hot offsets caused by temperature increase in the non-sheet passing portion are more likely to occur depending on the degree of continuity of the dots that make up the toner image formed in the corresponding area of the large-size paper. If the dots are isolated, the hot offset is more likely to occur than if the dots are continuous. Therefore, in the second embodiment, when a toner image is formed in the corresponding range of large-size paper, the processing time of “temperature uniformization control” is changed depending on the continuity of the dots to further reduce the downtime of the image forming apparatus 100. The “uniformization process” to achieve this is described below. FIG. 11 shows the “uniformization process” of the second embodiment. In the “uniformization process” shown in FIG. 11, the same step numbers are attached to the same processes as in the uniformization process of the first embodiment (see FIG. 7) described above, and the explanation is simplified or omitted.

As shown in FIG. 11, steps S1 through S4 are similar to the uniformization process of the first embodiment described above. If there is no toner in the detection area (NO in S4), CPU 316 executes “temperature uniformization control 2” (S7). In this case, CPU 316 repeats “temperature uniformization control 2” until the temperature difference ΔT becomes less than the threshold temperature difference (28° C.) (S8). In this way, when there is no toner in the detection area, the temperature difference between the temperature of the area through which the large-size paper passes and the temperature of the detection area when the large-size paper arrives at the fixing nip portion N after the small-size paper passes the nip portion N is larger than when the toner image forming area is in the corresponding range described below and the halftone image is included. If there is toner in the detection area (S4 YES), the CPU 316 determines whether the toner image in the detection area is “Class 2” (S21).

Image Classification

Figure 12:
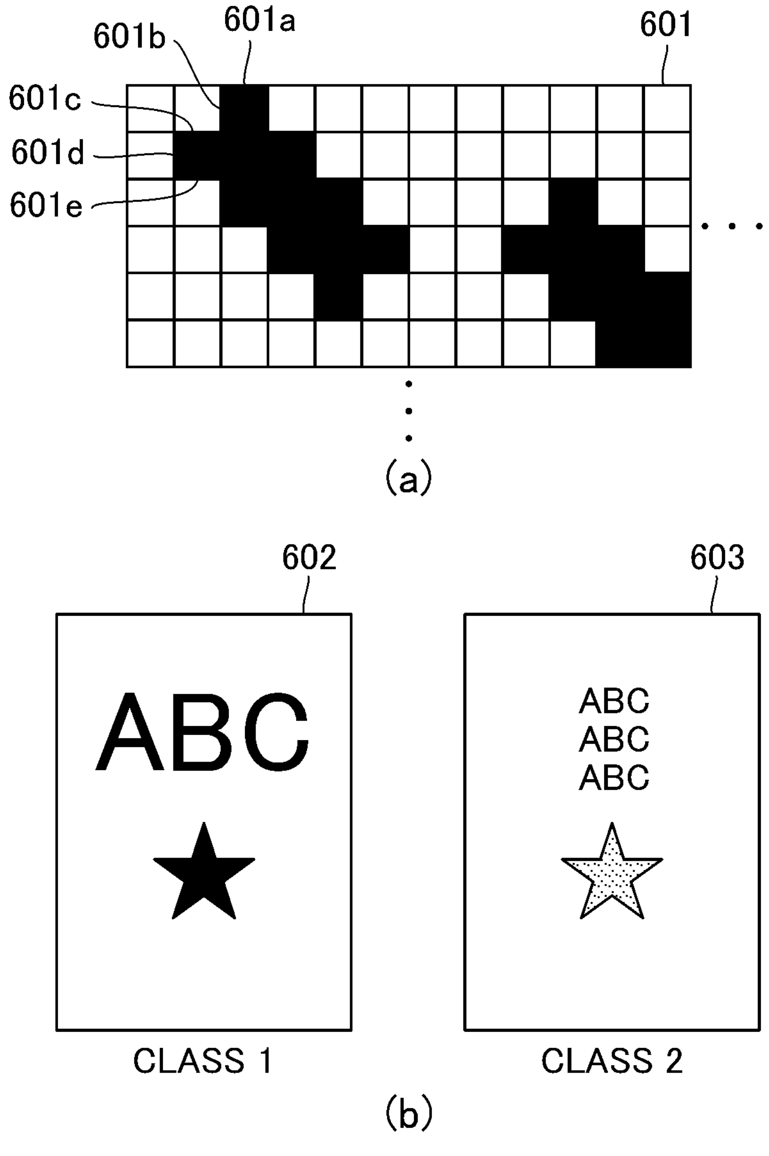
FIG. 12 is a view explaining the classification of images, with part (a) showing a part of the edge data, and part (b) showing Class 1 and Class 2 image images.

The classifying process of toner images is explained here using parts (a) and (b) of FIG. 12 with reference to FIG. 6. Parts (a) and (b) of FIG. 12 illustrate the “classification process.” The classification process classifies toner images to be formed in the corresponding area of large-size paper into predetermined classes based on image data concerning toner images to be formed in the corresponding area of large-size paper, according to the continuous range of pixels printed with toner of each CMYK color in the corresponding area. The classification process is executed by the CPU 304 of the system controller portion 301 (see FIG. 6).

First, CPU 304 compares the halftone data output from the halftone processing portion 312 and stored in RAM 306 with the predetermined threshold value to generate edge data for each color for each pixel. Edge data is generated as “1” when the CMYK data of each color in the halftone data exceeds the threshold value, and “0” when the CMYK data of each color is below the threshold value. When the edge data is “1”, it indicates that toner is printed on that pixel. Part (a) of FIG. 12 shows a portion of the edge data for one page, and the code “601” indicates one pixel, which is the smallest unit. In part (a) of FIG. 12, the black pixel 601 has edge data of “1” and the white pixel 601 has edge data of “0”.

Next, the CPU 304 counts the pixels that have edge data different from the edge data of adjacent pixels for each color edge data for each pixel, and calculates the total number of edges for all pixels in a pixel block (e.g., 8×8 pixels). In part (a) of FIG. 12, the codes “601*a*-601*e*” represent edge locations, and the CPU 304 calculates the edge rate by dividing the number of pixels with edges by the number of pixels per unit area. The edge ratio here means the ratio of the number of pixels with edges per unit area, i.e., the number of pixels where the difference of pixel values from adjacent pixels is greater than a predetermined value, to the number of pixels per unit area, with the pixel block as the unit. The more isolated the dots are, the greater the number of pixels with edges per unit area in the pixel block. The unit of the edge ratio is “%”.

The CPU 304 counts the degree of continuity of dots in the image block whose edge ratio is less than or equal to the predetermined first threshold in the part of the page where the toner is printed, and further determines whether or not it contains an object whose degree of continuity of dots is greater than the predetermined second threshold. If the CPU 304 includes an object whose dot contiguity is greater than the second threshold, it judges the toner image formed by that image data to be "Class 1". For example, as shown in part (b) of FIG. 12, if the image data (602) contains large point characters or solid images, those large point characters or solid images are judged as "Class 1".

On the other hand, if the image block with an edge ratio below the first threshold does not contain any object whose dot continuity is greater than the second threshold, the CPU 304 judges the toner image formed by that image data to be "Class 2". For example, as shown in part (b) of FIG. 12, if the image data (603) contains small point characters or halftone images (HT images), those small point characters or halftone images are judged as "Class 2".

Returning to the explanation in FIG. 11, if the toner image in the detection area is "Class 2" (YES in S21), CPU 316 executes "temperature uniformization control 1" (S5). In this case, CPU 316 repeats "temperature uniformization control 1" until the temperature difference ΔT becomes less than the threshold temperature difference (8° C. in this case) (S6). In the present embodiment, CPU 316 changes the threshold temperature difference to "8° C." if the toner image in the detection area is a "Class 2" image. If the temperature difference ΔT becomes less than or equal to the threshold temperature difference by "temperature uniformization control 1" (YES in S6), CPU 316 terminates "temperature uniformization control 1" (S9).

On the other hand, if the toner image in the detection area is not "Class 2", i.e., "Class 1" (NO in S21), CPU 316 executes "temperature uniformization control 3" (S22). Then, CPU 316 repeats "temperature uniformization control 3" until the temperature difference ΔT becomes less than or equal to the threshold temperature difference (in this case, 20° C.) (S23). In the present embodiment, CPU 316 changes the threshold temperature difference when the toner image in the detection area is "Class 2" to "20° C." (third temperature difference), which is lower than the threshold temperature difference when there is no toner (28° C.) and higher than the threshold temperature difference when the toner image is "Class 1" (8° C.). In other words, the temperature difference between the temperature of the area where the small-size paper passes through the fixing nip portion N and the temperature of the detection area when the large-size paper arrives at the fixing nip portion N is higher when a toner image is forming in the detection area and a halftone image is not included than when the toner image forming area includes a halftone image. If the temperature difference ΔT becomes less than or equal to the threshold temperature difference by the "temperature uniformization control 3" (YES in S23), the CPU 316 terminates the "temperature uniformization control 3" (S9). In this "temperature uniformization control 3", as in "temperature uniformization control 1" and "temperature uniformization control 2", the heater 132 is controlled to heat the fixing film 133 at a temperature that can lower the temperature of the non-passing area, and the fixing film 133 and pressure roller 134 are controlled to rotate idly (idle rotation mode).

After completing "temperature uniformization control 1", "temperature uniformization control 2" and "temperature uniformization control 3" (S9), the CPU 316 restarts the continuous image forming job that was once stopped to perform these temperature uniformization controls and starts passing the large-size paper, which is the subsequent paper following the small-size paper (S10). The CPU 316 then determines whether or not image formation for the total number of sheets of small-size paper and large-size paper has been completed (S11). If image formation for the total number of sheets has been completed (YES in S11), the CPU 316 terminates the uniformization process. If image formation for the total number of sheets has not been completed (NO in S11), the CPU 316 returns to the process in step S2.

Temperature Uniformization Control

Figure 13:
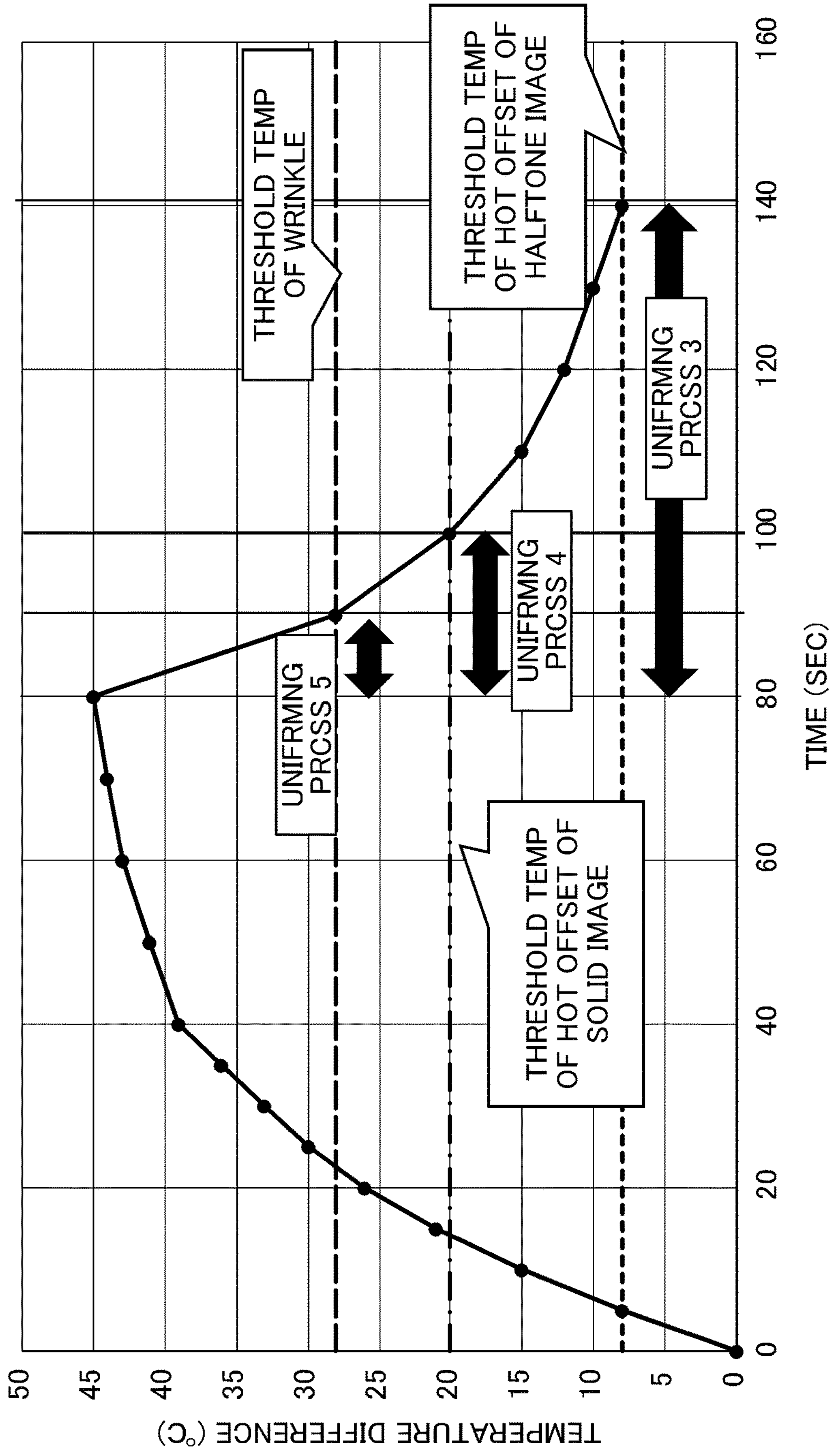
FIG. 13 is a graph showing the time variation of the temperature difference between the passing and non-passing areas in the second embodiment.
Figure 14:
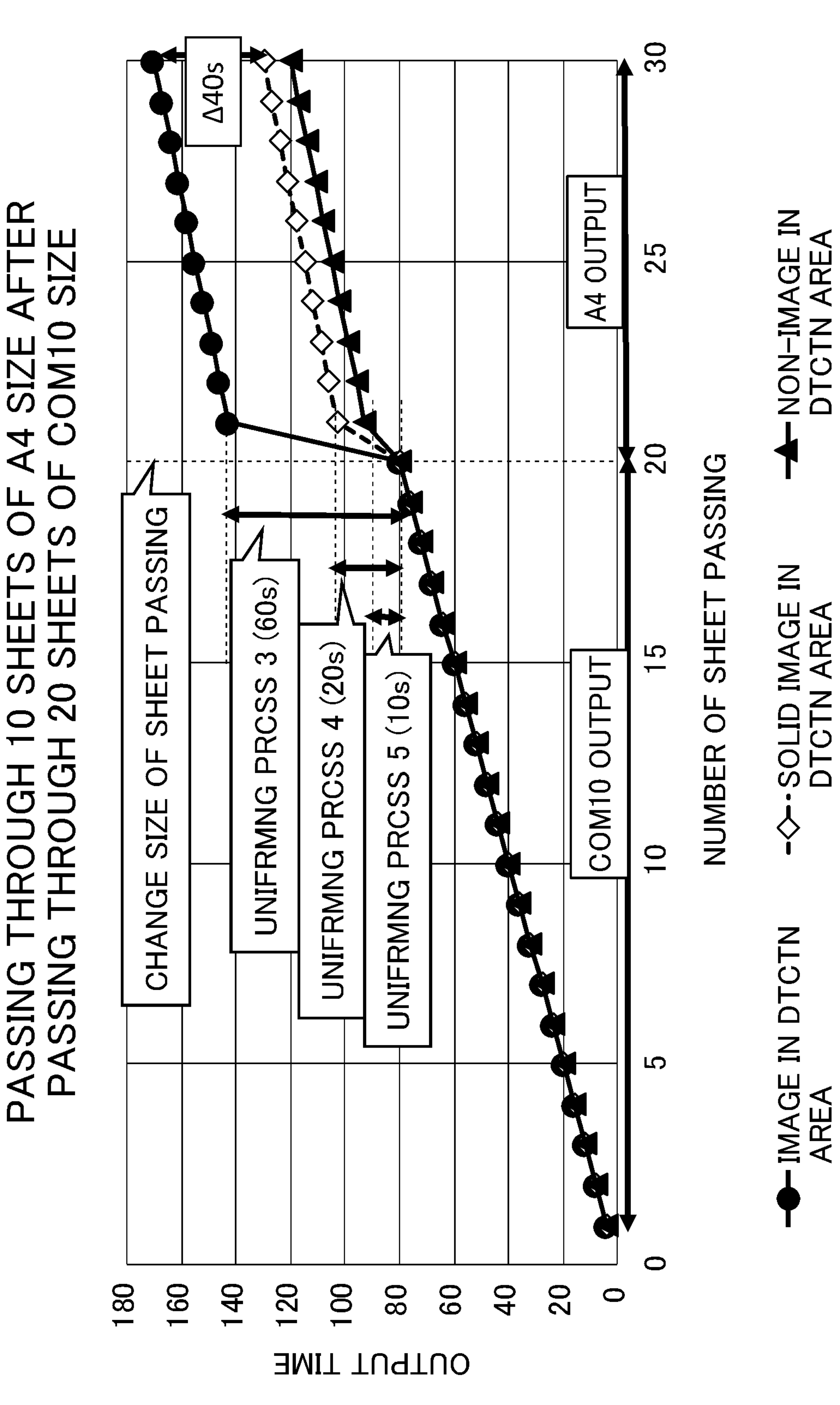
FIG. 14 is a view showing the difference in output time according to the image pattern in the detection area.

The above temperature uniformization control is explained using FIGS. 13 and 14. FIG. 13 shows the time variation of the temperature difference between the passing and non-passing areas in the fixing film 133 when 20 COM10 size envelopes (small-size paper) are continuously passed. In the present embodiment, even if a toner image is formed in the corresponding area of large-size paper, the hot offset does not occur regardless of the class of toner image (Class 1 or Class 2) as long as the temperature difference between the passing and non-passing areas of the fixing film 133 is "8° C." or less. In the case of the present embodiment, the temperature difference between the passing and non-passing areas can be reduced from "45° C." to "8° C." by performing "temperature uniformization control 1" for "60 seconds" (80 to 140 seconds) after passing 20 consecutive sheets of small-size paper at a throughput of "15 ppm".

However, it was found that the temperature difference between the passing and non-passing areas of the fixing film 133, where the hot offset occurs, is different when the toner image formed in the corresponding area of the large-size paper is a small-point character or halftone image, i.e., the toner image class is "Class 2", and when the toner image formed in the corresponding area of the large-size paper is a large-point character or solid image, i.e., the toner image class is "Class 1". When the toner image is "Class 1", the hot offset does not occur if the temperature difference between the passing and non-passing areas of the fixing film 133 is less than "20° C.", even if the temperature difference is not less than "8° C.". On the other hand, if the toner image is "Class 2", the hot offset can occur if the temperature difference between the passing and non-passing areas of the fixing film 133 is greater than "8° C.". This is because the degree of toner adhesion depends on the continuity of dots. That is, if the dots are continuous, the hot offset is not likely to occur due to the connection of toner between the dots, and if the dots are isolated without continuity, the hot offset is likely to occur.

In the present embodiment, when the toner image class is "Class 1", "temperature uniformization control 3" is performed for "20 seconds" (80 to 100 seconds) after 20 consecutive sheets of small-size paper are passed at a throughput of "15 ppm" to reduce the temperature difference between the passing area and non-passing area from "45° C." to "20° C.". The processing time of "temperature uniformization control 3" (20 seconds, third time) is also the time during which the continuous image forming job is temporarily stopped, which is the downtime of the image forming apparatus 100, but it is shorter than the processing time of "temperature uniformization control 1" (60 seconds).

If no toner image is formed in the corresponding area of the large-size paper, "temperature uniformization control 2" is performed (see S7 in FIG. 11). As described above, when no toner image is formed in the corresponding area of the large-size paper, the "temperature uniformization control 2" is performed for 10 seconds to reduce the temperature difference between the passing area and the non-passing area to 28° C. In this way, when there is no toner in the corresponding area of the large-size paper, the processing time of "temperature uniformization control" can be shorter than when there is toner, thus improving the operational efficiency of the image forming apparatus 100. In addition, "wrinkles" can be prevented from occurring on the large-size paper.

FIG. 14 shows the output time according to when 20 COM10 size envelopes (small-size paper) are continuously passed, and 10 A4 size paper (large-size paper) are continuously passed after the above "temperature uniformization control" is performed. The time required to continuously pass 20 sheets of small-size paper is "80 seconds" and the time required to continuously pass 10 sheets of large-size paper is "30 seconds".

In the present embodiment, "temperature uniformization control 1" is performed when the toner image formed in the corresponding area of the large-size paper has a halftone image (in the case of Class 2). Hence, as shown in FIG. 14, the passing of the large-size paper starts at "140 seconds" after the "temperature uniformization control 1" processing time of "60 seconds" (first time) has elapsed from the end of the passage of the small-size paper (80 seconds). Then, it takes "30 seconds" to pass 10 sheets of large-size paper, so it takes "170 seconds" to finish this continuous image forming job.

If there is no toner in the corresponding area of the large-size paper, "temperature uniformization control 2" is performed. Hence, as shown in FIG. 14, the passing of the large-size paper starts at "90 seconds" after the "temperature uniformization control 2" processing time of "10 seconds" (second time) has elapsed from the end of the passage of the small-size paper (80 seconds). Then, it takes "30 seconds" to pass 10 sheets of large-size paper, so it takes "120 seconds" to finish this continuous image forming job. In other words, the time required for a continuous image forming job can be reduced by "50 seconds".

When there is no halftone image in the toner image forming control in the corresponding area of the large-size paper (Class 1 case), "temperature uniformization control 3" is performed. Hence, as shown in FIG. 14, the passing of the large-size paper starts at "100 seconds," which is "20 seconds" (the third time) after the processing time of "temperature uniformization control 3" has elapsed from the end of the passage of the small-size paper (80 seconds). Then, it takes "30 seconds" to pass 10 sheets of large-size paper, so it takes "130 seconds" to finish this continuous image forming job. Thus, when a solid image is formed on the corresponding area of the large-size paper, the processing time for "temperature uniformization control" can be shorter than when a halftone image is formed. In other words, the downtime of the image forming apparatus 100 can be reduced, thereby improving the operational efficiency of the image forming apparatus 100.

As described above, in the second embodiment, as in the first embodiment described above, the processing time of "temperature uniformization control" is made to change between cases where there is toner in the corresponding area of large-size paper and cases where there is no toner. Furthermore, in the second embodiment, the threshold temperature difference as the termination condition to terminate the "temperature uniformization control" is changed in consideration of the image pattern, in light of the fact that the degree of toner adhesion can vary depending on the image pattern of the toner image formed when toner is present. As mentioned above, for example, when a solid image is formed in the corresponding area of the large-size paper, the processing time of "temperature uniformization control" is shorter than when a halftone image is formed. Thus, it is possible to both suppress the hot offsets caused by temperature increase in the non-sheet passing portion and reduce downtime of the image forming apparatus.

Other Embodiments

In the embodiments described above, the direct transfer method, in which the toner image formed on the photosensitive drum is directly transferred to the recording material, is described, but the intermediary transfer method, in which the toner image formed on the photosensitive drum is transferred to the intermediary transfer belt, can also be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-205017 filed on Dec. 22, 2022, which is hereby incorporated by reference herein in its entirety.

What is claimed is:

1. An image forming apparatus comprising:

an image forming portion configured to form a toner image on a recording material;

a fixing portion including a first rotatable member configured to apply heat to the recording material, a heating portion configured to heat the first rotatable member, and a second rotatable member configured to form a fixing nip portion for fixing the toner image on the recording material by nipping and conveying the recording material in contact with the first rotatable member; and a control portion being capable of changing a time from when a trailing end of a predetermined recording material has passed through the fixing nip portion until when a subsequent recording material following the predetermined recording material reaches the fixing nip portion, wherein the control portion is configured to execute a job in which image formation is performed on a first recording material and a second recording material, the second recording material being conveyed after the first recording material and having a size in a widthwise direction crossing to a conveyance direction larger than that of the first recording material, wherein when a width of the toner image to be formed on the recording material with respect to the widthwise direction is defined as an image area width, the control portion controls so that the time in a case in which the width of the first recording material is equal to or longer than the image area width of the second recording material is shorter than the time in a case in which the width of the first recording material is shorter than the image area width of the second recording material.

2. An image forming apparatus according to claim 1, further comprising, when a width where the first recording material passes through the fixing nip portion with respect to the widthwise direction is defined as a first width, and a width where the second recording material passes through the fixing nip portion other than the first width with respect to the widthwise direction is defined as a detection width, a first detecting portion configured to detect a temperature of the first width in the first rotatable member; and a second detecting portion configured to detect a temperature of the detection width in the first rotatable member.

3. An image forming apparatus according to claim 2, wherein a temperature difference between the temperature in the first width and the temperature in the detection width, when from the first recording material has passed through the fixing nip portion until when the second recording material reaches the fixing nip portion, in the case in which the width of the first recording material is shorter than the image area width of the second recording material is smaller than that in the case in which the width of the first recording material is equal to or longer than the image area width of the second recording material.

4. An image forming apparatus according to claim 2, wherein during the job, the control portion controls so that a halftone image is included in the image area width.

5. An image forming apparatus according to claim 4, wherein a temperature difference between the temperature in the first width and the temperature in the detection width, when from the first recording material has passed through the fixing nip portion until when the second recording material reaches the fixing nip portion, in a case in which the halftone image is not formed in the detection width is larger than that in a case in which the halftone image is included in the toner image formed in the detection width.

6. An image forming apparatus according to claim 4, wherein a temperature difference between a temperature of a passing area of the first width and the temperature of the detection width, when from the first recording material has passed through the fixing nip portion until when the second recording material reaches the fixing nip portion, in a case in which the toner image is formed in the detection width and the halftone image is not included in the detection width is smaller than that in a case in which the halftone image is included in the toner image formed in the detection width.

7. An image forming apparatus according to claim 2, further comprising a toner presence/absence detecting portion configured to acquire a print area ratio of the toner image formed in the detection width based on an image data and detect that there is the toner in the detection width in a case in which the print area ratio exceeds a threshold value.

8. An image forming apparatus according to claim 1, wherein the first rotatable member includes a fixing belt formed in an endless shape.

9. An image forming apparatus according to claim 8, wherein the heating portion includes a heater, and wherein the heater heats the fixing belt in contact with an inner peripheral surface of the fixing belt.

10. An image forming apparatus according to claim 9, wherein the second rotatable member includes a roller, and wherein the roller forms the fixing nip portion with the heater via the fixing belt.

11. An image forming apparatus according to claim 1, wherein the first rotatable member includes a fixing belt formed in an endless shape, wherein the heating portion includes a heater, wherein the heater is disposed inside of the fixing belt and heats the fixing belt, wherein the second rotatable member includes a roller, and wherein the roller forms the fixing nip portion with the heater via the fixing belt.

* * * * *